No. 685,694. Patented Oct. 29, 1901.
G. H. SCHAMP.
PIPE UNION.
(Application filed Aug. 14, 1901.)
(No Model.)
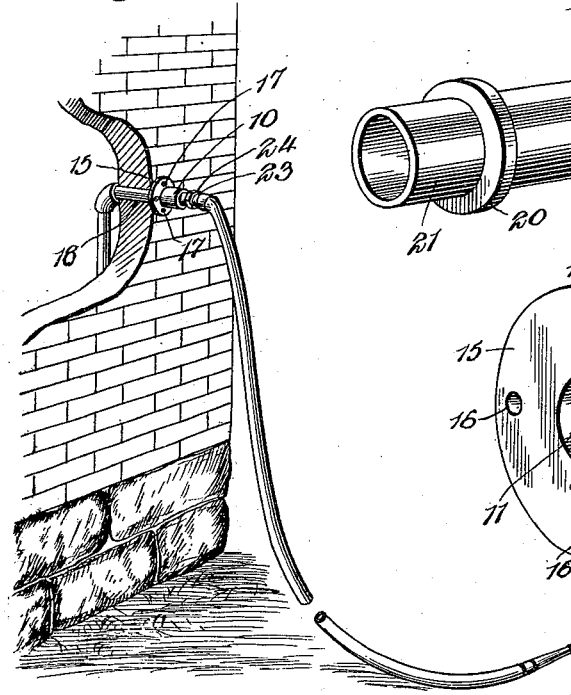
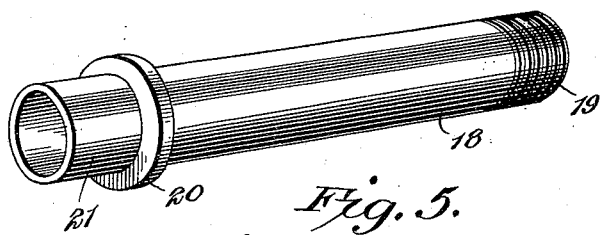
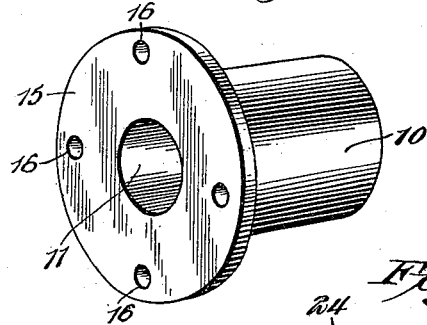
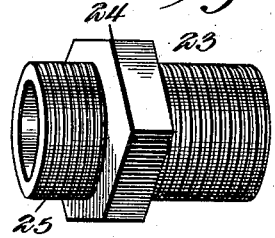
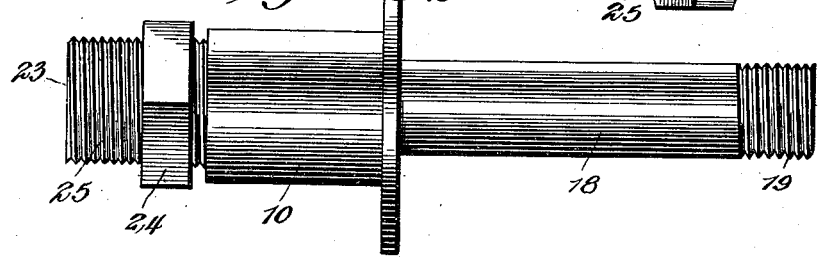
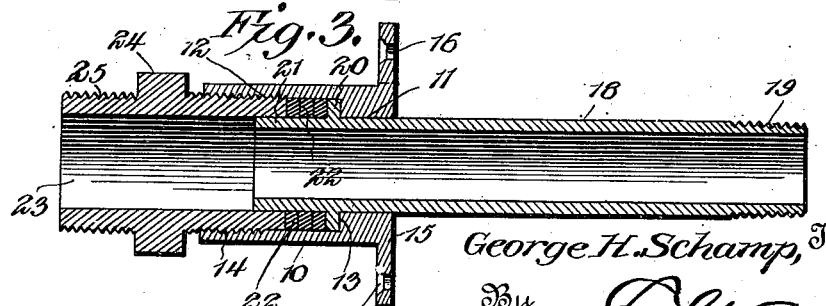
George H. Schamp, Inventor:
Witnesses
Howard W. Orr.
B. G. Foster
Attorney

UNITED STATES PATENT OFFICE.

GEORGE H. SCHAMP, OF RIDGEVILLE, INDIANA, ASSIGNOR OF ONE-HALF TO ENOCH W. BUCK, OF PORTLAND, INDIANA.

PIPE-UNION.

SPECIFICATION forming part of Letters Patent No. 685,694, dated October 29, 1901.

Application filed August 14, 1901. Serial No. 72,061. (No model.)

*To all whom it may concern:*

Be it known that I, GEORGE H. SCHAMP, a citizen of the United States, residing at Ridgeville, in the county of Randolph and State of Indiana, have invented a new and useful Pipe-Union, of which the following is a specification.

The present invention relates to pipe-unions; and the object thereof is to provide a simple coupling for connecting various kinds of pipes for the conveyance of water, steam, or other fluid.

One of the important features of the invention resides in a novel coupling which is thoroughly packed against leaking, but may be readily taken apart, so that said packing is entirely accessible for the purposes of renewal or repair, and to construct the coupling so that it may be securely attached to a wall or other support.

In the accompanying drawings the preferred embodiment of the invention is shown, and the construction and operation thereof are fully described in the following specification.

It will of course be understood that such slight changes may be made from the construction shown and described as are within the scope of the claims hereto appended.

In the drawings, Figure 1 is a perspective view showing the coupling applied to a wall. Fig. 2 is a side elevation, on an enlarged scale, of the coupling detached. Fig. 3 is a vertical sectional view of the same. Figs. 4, 5, and 6 are detail views of the several elements.

Similar numerals of reference designate corresponding parts in all the figures of the drawings.

In carrying out the invention a body 10 is provided, having a longitudinally-disposed bore 11 and a counterbore 12, concentric therewith, whereby an annular shoulder 13 is formed. The outer end of the counterbore is preferably screw-threaded, as shown at 14.
The outer face of the body 10 is provided at one end with an annular supporting-flange 15, having a plurality of openings 16, designed to receive screws 17 or other fastening devices, by means of which the body may be secured to a wall, as shown in Fig. 1.

Detachably mounted in the body is a tube-section 18, which section is provided at one end with external screw-threads 19, affording means for securing a supply-pipe thereto. Contiguous to the other end of the tube-section there is located an annular collar 20, which abuts against the interior shoulder 13 of the body, as is clearly shown in Fig. 3. The tube extends beyond this collar in the form of a shank portion 21, that therefore projects into the counterbore and is spaced from the face of the same. Located upon this shank portion is packing 22, shown in the form of a plurality of separate washers, which may be of any desired construction, such as fiber, rubber, or asbestos, according to the use to which the coupling is put. A plug 23 is screwed into the counterbore and projects into the space between the shank portion and the inner face thereof, thereby abutting against the washers and compressing them sufficiently to insure a liquid-tight joint. This plug 23 is provided intermediate its ends with an angular head 24, and its outer end is screw-threaded, as at 25, to form means for attaching a hose or other pipe, as shown in Fig. 1.

The application of the device will be readily apparent. The body is first secured at the desired location upon the wall or support and the tube-section is then passed through the same until the flange 20 thereof abuts against the shoulder 13. The packing is then inserted and the plug screwed down upon the same. A liquid-tight joint is therefore insured, and at the same time should it become desirable to disassociate the coupling it can be readily accomplished by removing the plug.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a coupling of the class described, the combination with a body having an interior bore and a counterbore forming an annular shoulder, said body being also provided with an exteriorly-arranged fastening-flange, of a tube-section extending into the bore of the body and having an annular collar that bears against the shoulder thereof, said tube-section being furthermore provided with a shank portion projecting beyond the collar, packing located upon the shank portion, and a plug fitted into the counterbore between the shank and the wall of the body and bearing against the packing.

2. In a coupling of the class described, the combination with a body having an interior longitudinally-disposed bore and a counterbore concentric therewith forming an annular shoulder, said body being also provided at one end with an exteriorly-arranged annular fastening-flange, of a tube-section detachably fitting in the bore of the body and having an annular collar that bears against the shoulder thereof, said tube-section being furthermore provided with a shank portion projecting beyond the collar and into the counterbore, packing-rings located upon the shank portion, and a plug fitted into the counterbore between the shank and the wall of the body and bearing against the packing-rings, said plug having an angular portion intermediate its ends, and an exposed screw-threaded portion.

In testimony that I claim the foregoing as my own I have hereto affixed my signature in the presence of two witnesses.

GEORGE H. SCHAMP.

Witnesses:
C. W. McLAUGHLIN,
R. D. WHEAT.